United States Patent Office

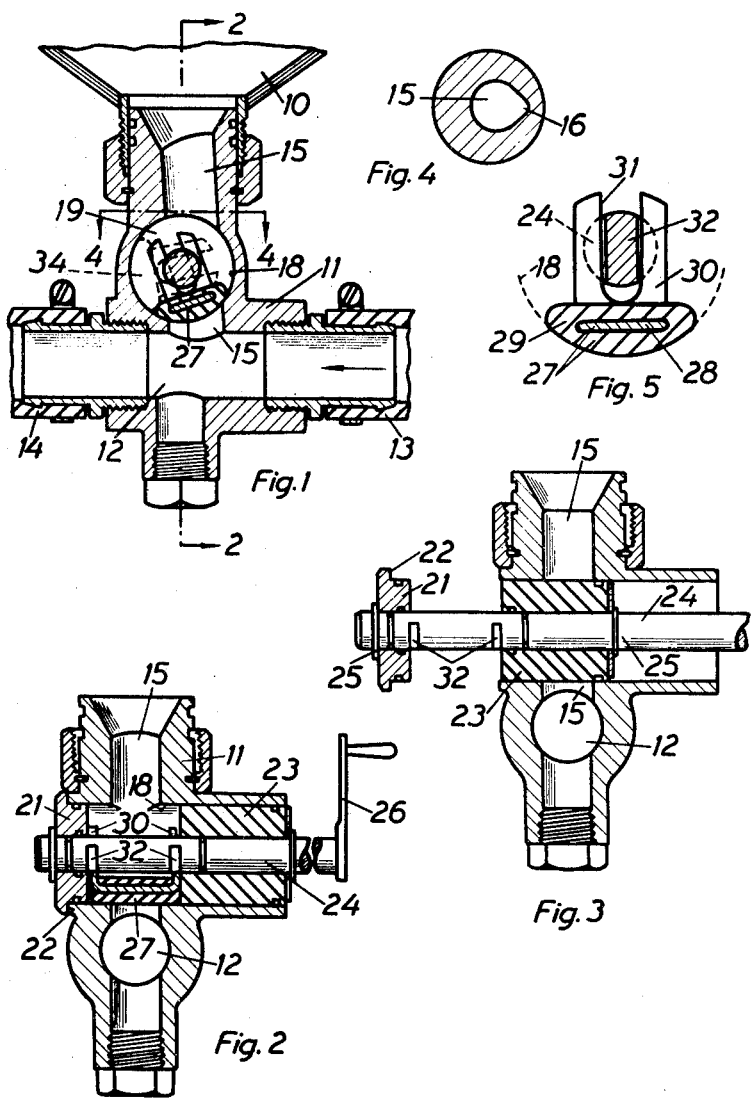

3,496,958
Patented Feb. 24, 1970

3,496,958
SAND VALVE FOR SAND-BLAST APPARATUS
Karl August Valdemar Magnusson, Klinten, and Kurt Herman Liedberg, Skara, Sweden, assignors to Atlas Copco Aktiebolag, Nacka, Sweden, a corporation of Sweden
Filed Aug. 28, 1967, Ser. No. 663,671
Claims priority, application Sweden, Sept. 1, 1966, 11,761/66
Int. Cl. F16k 5/04, 5/18
U.S. Cl. 137—315
10 Claims

ABSTRACT OF THE DISCLOSURE

A sand valve for sand-blast apparatus has a sand discharge channel controlled by a valve body in a cross bore intersecting said channel, there being disposed a plug means in the bore adjacent the valve body and slidable together therewith into sealing alignment with the channel so that the channel is closed tight and the valve body is uncovered by the bore and can be exchanged.

---

This invention relates to a sand valve for sand-blast apparatus and more particularly to a sand valve for controlling the discharge channel from a pressurized sand hopper. Such valves are subject to very heavy wear because of the abrasive action of the sand flow passing therethrough. When the valve body is worn down and has to be exchanged, much time is lost during detaching and attaching of the valve bdoy and the emptying and replenishment of the sand hopper caused thereby.

It is the main object of the invention to create a sand valve with increased operable life and adapted for making possible rapid exchange of the valve body without emptying of the sand hopper. For these and other purposes there is according to the invention provided a sand valve for sand-blast apparatus particularly for controlling the discharge channel from a pressurized sand hopper, said sand valve comprising a valve housing connectable to said hopper, a discharge channel in said valve housing in communication with said hopper, a cross bore in said housing intersecting said discharge channel, a valve body in said cross bore for controlling the discharge of sand through said discharge channel, and a plug means adjacent to said valve body in the cross bore for axial slidable displacement therein together with said valve body between a working position with said valve body in alignment with the discharge channel and said plug means off-set thereto in said cross bore and a valve exchanging position with said plug means in sealing alignment with the discharge channel and said valve body off-set thereto and uncovered by said cross bore. Thanks to this embodiment the sand hopper is sealed off automatically during exchange or inspection of the valve.

The above and other objects of the invention will become obvious from the following description and from the accompanying drawing in which a preferred embodiment of the invention is illustrated by way of example. It should be understood that this embodiment is only illustrative of the invention and various modifications may be made within the scope of the claims.

In the drawing FIG. 1 shows a longitudinal section of the sand valve. FIG. 2 is a longitudinal section on the line 2—2 in FIG. 1. FIG. 3 shows the elements in FIG. 2 during exchange of the valve body. FIG. 4 is a cross section on the line 4—4 in FIG. 1. FIG. 5 finally shows the valve body in FIG. 1 on a larger scale with one of the shanks thereof in engagement with grooves on a cooperating turning spindle.

In FIG. 1 on the lower end of a pressurized sand hopper 10 there is screwed on a valve housing 11. The valve housing 11 has at the lower end thereof a mixing channel 12 which is supplied with compressed air at one end thereof from a suitable source via a hose 13. From the mixing channel 12 a suitable mixture of sand and air is discharged via a sand-blast hose 14 to a sand-blast nozzle, not shown. The sand is supplied to the mixing channel 12 from above from the sand hopper 10 via a discharge channel 15. As shown in FIG. 4, the cross section of the discharge channel 15 has a tip 16 facing the inlet direction of the compressed air into the mixing channel 12.

The outlet channel 15 is intersected by a cross bore 18 with a diameter larger than the maximum width of the discharge channel 15. Preferably the bore 18 is somewhat displaced laterally with respect to the discharge channel 15 so that the partly cylindrical portion 19, FIG. 1, of the bore 18 falling outside of the extension of the discharge channel 15, becomes substantially larger than the corresponding portion at the other side of the discharge channel 15. In order to provide better room for a sufficient lateral displacement of the cross bore 18 within the valve housing 11, the discharge channel 15 is arranged somewhat inclined with respect to the axis of the mixing channel 12.

One end of the cross bore 18 is closed by a closure-shaped end wall 21 which is slidably inserted into the cross bore 18 and sealed thereagainst by a suitable sealing means such as a sealing ring. The end wall 21 rests against the valve housing 11 by an annular shoulder 22. The other end of the cross bore 18 receives slidably and sealingly therein a cylindrical end wall 23 or plug means in the shape of a plug of rubber preferably with one or more rings for additional sealing therearound. The end walls 21, 23 are passed sealingly by a turning spindle 24 which is provided with spaced lock rings 25 between which the end walls 21, 23 are fixed axially with respect to one another. The turning spindle 24 may be turned by means of a handle 26.

Between the end walls 21, 23 there is inserted into the bore 18 a valve body 27 consisting of a partly cylindrical rubber body 29, FIG. 5, vulcanized fast around the base of a U-shaped reinforcing plate 28 and with segment-shaped cross section with the radius of the segment's arc equal to the radius of the cross bore. The shanks 30 of the reinforcing plate 28 are provided with longitudinal open notches 31 in slidable but non-rotatable engagement with cooperating grooves 32 on the turning spindle 24 which is straddled by the shanks 30. By turning of the spindle 24 one thus can turn the valve body 27 which slides along the wall of the cross bore 18 and depending on the adjustment cuts off a larger or smaller portion of the discharge channel 15 downstream thereof. In connection therewith the valve body 27 projects to a greater or lesser degree into the wide portiton 19 of the cross bore 18 outside of the discharge channel 15 such as to take a position entirely outside of the sand flow passing the discharge channel 15 in the fully open position of the valve body 27, designated by broken lines and the numeral 34 in FIG. 1. The valve body 27 is retained in the adjusted position by friction, sand pressure and by suitable locking means, not illustrated, for the handle 26.

If due to wear the valve is to be turned over on the spindle 24 or exchange, one releases the handle 26 from the locking means if such locking means are present and moves the turning spindle 24 deeper into the cross bore 18 from the position shown in FIG. 2 to the position depicted in FIG. 3, wherein the valve body 29 is uncovered by the cross bore 18 and may be taken away radially from the spindle 24 and turned over or exchanged. In this valve changing position the end wall 23 takes a position in alignment with the discharge channel and closes the latter sealingly whereby the sand left in the hopper 18 remains undisturbed therein under air pressure. Upon pushing of a new valve body 27 in place with the shank notches 31 thereof straddling the grooves 32, the turning spindle 24 is returned to the position depicted in FIG. 2 and the sand valve is thus again ready for use.

In cooperation with the valve body 27, the tipped portion 16 of the discharge channel makes possible a substantially increased exactness in setting of the sand concentration per cubic meter of air and thanks to this the sand-blasting work may be performed with better economy.

What we claim is:

1. Sand valve for sand-blast apparatus particularly for controlling the discharge channel from a pressurized sand hopper, said sand valve comprising a valve housing connectable to said hopper, a discharge channel in said valve housing in communication with said hopper, a cross bore in said housing intersecting said discharge channel, a valve member in said cross bore for controlling the discharge of sand through said discharge channel, and a plug means adjacent to said valve member sealingly in the cross bore for axial slidable displacement therein together with said valve member wherein said valve members and plug means are in a working position said valve member is in alignment with the discharge channel and said plug means is off-set with respect thereto in said cross bore and when said valve member and plug means are in a valve exchanging position said plug means is in sealing alignment with the discharge channel and said valve member is off-set with respect thereto and extending out of said cross bore.

2. Sand valve according to claim 1 in which said valve member is partly cylindrical in shape with a substantially segment shaped cross section, shank at the ends of said valve member, a turning spindle for said valve member projecting into said cross bore, and cooperating means on said shanks and said spindle for coupling said valve member non-rotatably but radially movably and releasably to said spindle.

3. Sand valve according to claim 2 in which said cross bore receives sealingly therein a pair of end walls at opposite sides of said valve member and mounted on said turning spindle, lock means on said spindle for fixing said end walls axially thereon, and one of said end walls forming said plug means.

4. Sand valve according to claim 2 in which said valve member is a rubber body, a U-shaped reinforcing plate carrying said rubber body around the base thereof, transverse grooves on said spindle, and the shanks of said plate having longitudinal notches thereon straddling said turning spindle and engaging said grooves, said notches and grooves forming said cooperating means for coupling said shanks non-rotatably but radially movably and releasably to said spindle.

5. Sand valve according to claim 2 in which said cross bore is laterally offset with respect to said discharge channel for providing a valve position for said valve member in the off-set portion of said cross bore outside of the sand flow passing said discharge channel.

6. Sand valve according to claim 1 in which said cross bore is closed sealingly by end walls at opposite sides of said valve member, one of said end walls forming said plug means.

7. Sand valve for sand-blast apparatus particularly for controlling the discharge channel from a pressurized sand hopper, said sand valve comprising a valve housing connectable to said hopper, a discharge channel in said valve housing in communication with said hopper, an open ended cross bore in said housing intersecting and perpendicular to said discharge channel, a valve member rotatably received in said cross bore for controlling the discharge of sand through said discharge channel, a spindle projecting through said cross bore and connected to said valve member for rotation thereof, and end walls on said spindle at opposite sides of said valve member sealingly and slidably received in said cross bore at the opposed ends thereof for axial displacement therein together with said valve member wherein when said valve body and both end walls are in a working position said valve member and both end walls are in said cross bore and said valve member is in alignment with the discharge channel and when said valve member and end walls are in a valve exchanging position one of said end walls is in sealing alignment with the discharge channel and said valve member and the other of said end walls is out of said cross bore.

8. Sand valve according to claim 7 in which there are provided cooperating means on said valve member and said spindle for coupling said valve member non-rotatably but radially movably and releasably to said spindle.

9. Sand valve according to claim 7 in which said discharge channel is tipped in cross section with the tip thereof disposed in a plane perpendicular to said cross bore.

10. Sand valve for sand-blast apparatus particularly for controlling the discharge channel from a pressurized sand hopper, said sand valve comprising a valve housing connectable to said hopper, a discharge channel in said valve housing in communication with said hopper, a cross bore in said housing intersecting and perpendicular to said discharge channel, a control valve member in said cross bore for controlling the discharge of sand through said discharge channel, end walls connected to said valve member at opposite sides thereof and slidably and sealingly received in said cross bore at the opposed ends thereof for axial slidable displacement therein together with said valve member wherein when said valve member and both end walls are in a working position said valve member and both end walls are in said cross bore and said valve member is in alignment with the discharge channel and when said valve member and both end walls are in a valve exchanging position one of said end walls is in sealing alignment with the discharge channel and said valve member and the other of said end walls is out of said cross bore.

References Cited

UNITED STATES PATENTS

| 1,856,138 | 5/1932 | Ruemelin | 251—298 |
| 3,301,271 | 1/1967 | Burke | 137—315 |
| 3,379,408 | 4/1968 | Lowrey | 251—298 |

WILLIAM F. O'DEA, Primary Examiner

DAVID R. MATTHEWS, Assistant Examiner

U.S. Cl. X.R.

137—329.01; 251—298

PO-1050
(5/69)

UNITED STATES PATENT OFFICE
CERTIFICATE OF CORRECTION

Patent No. 3,496,958      Dated February 24, 1970

Inventor(s) KARL AUGUST VALDEMAR MAGNUSSON and KURT HERMAN LIEDBERG

It is certified that error appears in the above-identified patent and that said Letters Patent are hereby corrected as shown below:

Column 3, line 27, after "wherein" insert --when--; column 3, line 37, the word "shank" should read --shanks--.

SIGNED AND
SEALED
JUL 14 1970

(SEAL)
Attest:

Edward M. Fletcher, Jr.
Attesting Officer

WILLIAM E. SCHUYLER, JR.
Commissioner of Patents